United States Patent Office 2,978,700
Patented Apr. 4, 1961

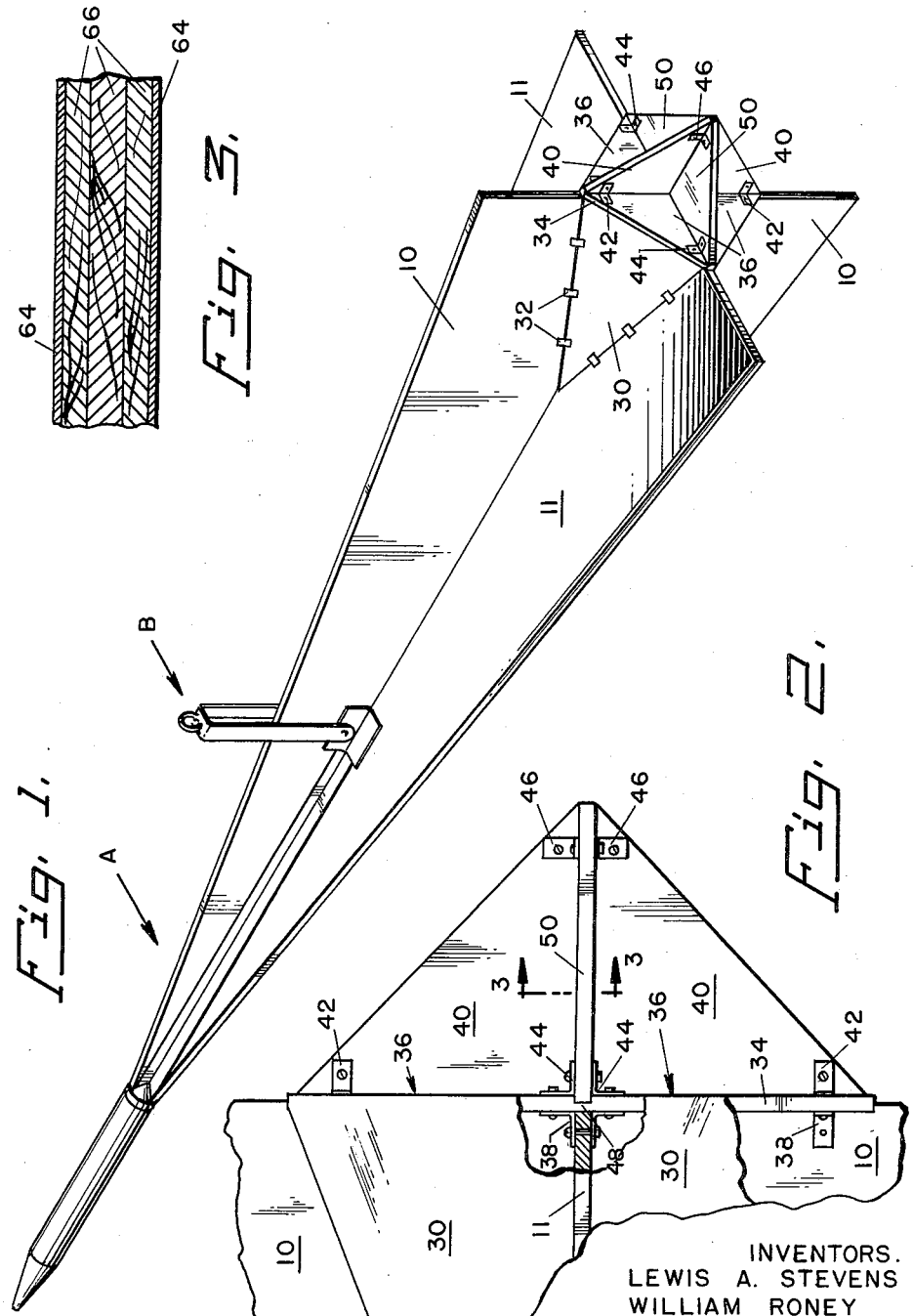

2,978,700
RADAR REFLECTING TOW TARGET

Lewis A. Stevens, Ridgecrest, and William S. Roney, China Lake, Calif., assignors to the United States of America as represented by the Secretary of the Navy Filed Sept. 14, 1956, Ser. No. 610,038
2 Claims. (Cl. 343—18)
(Granted under Title 35, U.S. Code (1952), sec. 266)

The invention described herein may be manufactured and used by or for the Government of the United States of America for governmental purposes without the payment of any royalties thereon or therefor.

This invention relates to radar reflecting devices, and more particularly to radar reflecting devices of simple, economical construction which are capable of maintaining rigidity and efficiency under conditions of great stress, as when drawn through the air at high speeds.

With the advent of high speed aircraft, the problems of training aviation personnel and of evaluating equipment gave rise to the necessity for the development of targets capable of stable flight at high speeds and such targets generally vary greatly in design and nature. Thus high speed drones, manned aircraft, or tow targets may be used in training or evaluation procedures. The most economical and satisfactory expedient is the tow target, and considerable effort has been expended in the development of tow targets capable of stable flight at exceedingly high speeds. One successful high speed tow target configuration is disclosed in copending application Serial No. 543,043, filed October 26, 1955, which has matured into U.S. Patent No. 2,821,396, issued January 28, 1958. As a related problem, the concurrent development of various types of radar equipment made it desirable that tow targets or the like be provided with radar reflecting means to be used in conjunction with navigational and ordnance equipment utilizing a radar principle for the evaluation of such equipment and for the training of personnel in the use thereof.

It has been known in the prior art that so-called corner reflectors or trihedral reflecting units could be used to reflect electomagnetic radiation, such as radar waves, back to the source of emanation. Such corner reflectors generally consist of three mutually perpendicular, intersecting, electrically conductive planar vanes, and it is essential to their efficient operation that the plane surfaces be conductive and that the angles between the surfaces be exactly perpendicular or at least vibrate, to slight degree, through the perpendicular. In stationary installations, where high wind stream forces are not encountered, the vanes have been made of thin metallic sheets, or of flexible woven metallic cloth. In airborne reflecting devices, however, flimsy or thin reflecting surfaces are impractical because they break, or bend, or flutter so violently as to be inoperative. Accordingly, prior to this invention, airborne radar reflecting devices (as used in conjunction with the training of aviation personnel or in the evaluation of equipment) have been constructed of comparatively thick metal plate to overcome the flimsiness of the stationary type reflectors mentioned above. The use of such heavy gage materials provides sufficient sturdiness for high speed flight and for withstanding violent launching and retrieving shocks and forces but has attendant disadvantages which have made the use of such devices generally unsatisfactory. The greatest disadvantage stems from the fact that the strength and rigidity required for high speed aerial use is such that vibration of reflecting surfaces must be precluded completely, so that approximately perpendicular association of the walls comprising the corner is not sufficient, as in the case of thinner, less rigid walls used in stationary or low speed installations. Therefore, for high speed use, relatively thick metallic plates and the means for joining said plates to one another must be very exactly machined and the joints very carefully effected since the angularity of the surfaces of the joined plates to one another is a very critical consideration in the proper operation of the reflector. This requisite for exactness results in difficulty in machining the metal pieces, with the expense attendant to small tolerances and high percentages of rejects.

Obviously, the use of more easily worked rigid material, such as wood, would obviate the difficulty experienced relative to the expense of fabrication. However, the basic requirement for a conductive surface made it impossible, prior to this invention, to utilize such wooden panels because known coating techniques were incapable of providing a proper conductive surface.

This invention is predicated upon the discovery of coating techniques which make it possible to coat wooden panels (as plywood, for example) with metallic coatings in such a way as to provide unbroken conductive coatings thereon. This makes possible more economical and more easily fabricated wooden radar reflector constructions which materially reduce the cost of such constructions and increase the reliability thereof.

It is, therefore, an object of the present invention to provide novel radar reflector constructions of low cost and of improved dependability in performance in high speed aerial target use.

A further object of the invention is to provide radar reflector devices for use with high speed aerial targets, in which the reflecting surfaces may be built up on a base of wooden rather than metallic materials.

A still further object of this device is to provide novel metallic coated wood surfaces which are proper conductors whereby electromagnetic radiations such as radar waves may be reflected thereby.

Other objects and many of the attendant advantages of this invention will be readily appreciated as the same becomes better understood by reference to the following detailed description when considered in connection with the accompanying drawings, wherein:

Fig. 1 is a perspective view of a high speed tow target embodying a radar reflector construction according to this invention;

Fig. 2 is a fragmentary side elevation of the rearward portion of the target of Fig. 1, showing the details of the manner of attachment of the radar reflecting panels to the target, with parts of the target broken away for ease of illustration; and Fig. 3 is a fragmentary sectional view through one of the panels of the reflector device, as along the line 3—3 of Fig. 2, showing the coated plywood construction in section.

Attention is now directed to the drawings wherein the radar reflecting device which is the subject matter of this invention may be suitably mounted on any rigid structure but, for purposes of illustration the drawings show it as mounted upon a cruciform tow target of dart configuration. The particular tow target illustrated is the subject matter of a separate U.S. Patent application, Serial No. 543,043, mentioned hereinabove, and all the specific details thereof are not described herein since they do not form an essential part of the present invention. The target A may comprise a dart-shaped configuration of cruciform cross-section having vertical wings or fins 10 and horizontal wings or fins 11 suitably rigidly supported in perpendicular relationship to one another and provided with a suitable towing yoke B, as shown in the drawing. The rearward edges of the wing panels 10, 11 are in a common plane perpendicular to the longitudinal axis of the target body.

The rearward end of the target is provided with fairing strips 30 for bracing the rearward portion of the fins, such fairing strips serving also to divert the air stream around the lateral surfaces of the radar reflecting structure to be later described. Strips 30 may be attached between adjacent wings or fins in the configuration and position shown in the drawing, as for example by the use of angle clips 32, and are of such size and disposition as to form a rearwardly opening square of a size determined by the degree of support required for stabilizing the wings 10 and 11, by the desired size of the radar reflector, and by considerations of drag characteristics. In the illustrated example the fairings 30 are of a size and disposition such that the edges thereof extend to about the middle of the wings 10, 11 at the rearward extremity thereof, and such an arrangement has proven satisfactory.

An aft-facing radar-reflecting corner is provided in each quadrant at the after end of the target by the reflector construction of this invention and an example of a preferred construction is shown in the drawings. A rectangular sheet or panel of wooden material 34, of a configuration to substantially match the configuration of the open rear end of the attached fairing strips 30, is provided to form a reflecting surface 36 normal to the axis of the target, fairing strips 30 serving the function of diverting the airstream around the forward surface of sheet 34 to avoid excessive airstream pressures on that surface in flight. Sheet 34 is suitably attached to the tail end of fins 10, 11 by angle clips, as at 38. Attached to the rear surface 36 of sheet 34 are a plurality of pieces of wooden material to provide four reflecting corners at the aft end of the target, as shown. In the illustrated example, a single piece of material of isosceles triangle shape is attached to the reflecting surface 36 by angle clips 42 to form a pair of vertical reflector fins 40. A pair of horizontal reflector fins 50 are formed of a pair of right triangular pieces of wooden material which are attached to surface 36 and to appropriate sides of the vertical fins 40 by angle clips 44 and 46 respectively. The positioning and support of vertical and horizontal fins or vanes 40 and 50 of the reflector device may be effected by providing appropriate accurately cut positioning notches in the wooden pieces. One such positioning notch is shown at 48 in Fig. 2 to receive the forward edges of horizontal vanes 50. Similar notches may be provided in the rear wall of the panel 34 to receive the forward edge of vertical vane 40 and in the sides of vane 40 to receive the inner edges of horizontal vanes 50, if desired. Such notched construction, is not essential, of course, but merely illustrative of a preferred positioning and securing means.

The surface 36 and the reflector fins 40 and 50 are then coated with a conductive coating material to provide surfaces capable of reflecting electromagnetic radiations such as radar waves. By virtue of the simple construction set forth hereinabove, the easily worked wooden panels may be economically fitted to accurate mutually perpendicular trihedral forms so that accurate reflection of radar waves to the source is accomplished.

Generally, a sealer or filler material is applied on wooden surfaces prior to the application of paint thereto in order to provide a complete coating and one which would not scale or chip. However, when such ordinary techniques were applied to surfaces intended for use as reflectors for electromagnetic radiation, the surfaces were always non-conductive and thus unsatisfactory. It has been found that thin coating 64 of silver paint applied by spray or brush are satisfactorily conductive, but only if applied directly to the unfilled wood 66, that is, wood without the application of any filler material or paint to the surface thereof, as shown in Fig. 3.

This apparent anomaly, wherein apparently improper painting techniques give a more complete covering for this particular purpose than generally accepted techniques, is probably due to the fact that the filler material is redissolved by the vehicle of the outer coating material and lifted to contaminate and impair the conductivity of the outer coating. Extensive tests have shown that wooden panels coated with filler material and then with metallic conducting paints do not form surfaces which are properly conductive for reflecting electromagnetic radiation. Conversely, when silver paint is brushed or sprayed directly on unfilled wood to form a thin coating thereon, or when an unfilled wooden surface is metallized with a thin coating of metallic aluminum (sprayed thereon in molten condition), a conductive coating is formed which is very effective as a radiation reflecting surface. Such coatings might very well be of inferior quality for general coating utility but are ideal for this special purpose.

Therefore, in completing the radar reflector construction described above, a thin coating 64 of conducting silver paint or of metal is placed upon the unfilled after surface 36 of the backing panel 34 and on all exposed surfaces of reflector vanes 40 and 50. Any good quality conducting sliver paint may be used.

Alternatively, metallic aluminum may be melted and sprayed directly on appropriate unfilled wooden surfaces to a thickness in an order to provide good conductive reflecting surfaces.

From the above it may be seen that the present invention provides new and improved radar reflecting structures which are of an improved order of efficiency and which are more easily and economically constructed than prior art structures of the same general class.

Obviously, many modifications and variations of this invention are possible in the light of the above teachings. The wooden reflecting arrangement may be mounted on aircraft, stationary ground objects or on tow targets other than that specifically illustrated and described herein by the provision of appropriate support means. The nature and thickness of the conductive coating is also obviously subject to variation depending upon the properties thereof. It is therefore to be understood that the invention is not intended to be limited to the specific modification herein illustrated and discussed, its scope being rather defined by the language of the appended claims.

What is claimed is:

1. In combination, an aerial target comprising four planar wing elements and four triangularly-shaped fairing strips, said wing elements being secured together at right angles to each other along a horizontal axis, said fairing strips being secured to said wing elements with a fairing strip between each pair of adjacent wing elements, said fairing strips having substantially coplanar rear edges disposed rearwardly of said wing elements and defining a generally rectangular opening; and a radar reflecting assembly comprising a generally rectangular base and four fins in a cruciform arrangement, said base having substantially the same dimensions as said generally rectangular opening and fitting therewithin, said base being formed with notches along the diagonals thereof, and the front edges of said fins being fitted within said notches, said base and fins having a conductive metal coating thereon; and means securing the assembly to the target.

2. In the combination defined in claim 1, said diagonals being at right angles to each other.

References Cited in the file of this patent

UNITED STATES PATENTS

| | | |
|---|---|---|
| 2,492,358 | Clark | Dec. 27, 1949 |
| 2,639,426 | McAuley | May 19, 1953 |
| 2,702,900 | Matson | Feb. 22, 1955 |
| 2,746,035 | Norwood | May 15, 1956 |
| 2,747,180 | Brucker | May 22, 1956 |
| 2,753,390 | Feketics | July 3, 1956 |
| 2,778,010 | Leonard | Jan. 15, 1957 |
| 2,791,767 | Oberg | May 7, 1957 |
| 2,821,396 | Seeley | Jan. 28, 1958 |
| 2,823,376 | Baldwin et al. | Feb. 11, 1958 |